United States Patent [19]

Ridinger et al.

[11] Patent Number: 5,333,080
[45] Date of Patent: Jul. 26, 1994

[54] DISC CLAMP SHIM FOR A RIGID DISC DRIVE

[75] Inventors: Ernst W. Ridinger, Soquel; Ronald F. Fasano, Saratoga, both of Calif.

[73] Assignee: Seagate Technology, Inc., Scotts Valley, Calif.

[21] Appl. No.: 44,440

[22] Filed: Apr. 6, 1993

[51] Int. Cl.⁵ ............... G11B 17/022; G11B 17/038
[52] U.S. Cl. .................. 360/99.12; 360/98.08
[58] Field of Search ........... 360/99.12, 98.08, 98.01, 360/99.05; 369/270, 271

[56] References Cited

U.S. PATENT DOCUMENTS

| | | | |
|---|---|---|---|
| 4,864,443 | 9/1989 | Peterson | 360/99.12 |
| 4,875,118 | 10/1989 | Kaymaram | 360/99.12 |
| 4,896,231 | 1/1990 | Hoppe | 360/97.02 |
| 5,031,062 | 7/1991 | Wood et al. | 360/99.08 |
| 5,075,808 | 12/1991 | Johnson | 360/99.08 |
| 5,243,481 | 9/1993 | Dunckley et al. | 360/99.08 |
| 5,274,517 | 12/1993 | Chen | 360/99.08 |

*Primary Examiner*—John H. Wolff
*Attorney, Agent, or Firm*—Edward P. Heller, III

[57] ABSTRACT

A shim mechanism interposed between the hub of a spindle motor, used to mount and rotate discs in a disc drive data storage device, and the disc clamp used to secure the discs to the hub, the shim serving to evenly distribute the clamping force applied to the disc clamp by a plurality of screws equally spaced about the periphery of the disc clamp. The shim includes alignment means for centering the shim relative to the disc clamp and spindle motor hub, and a plurality of radially extending arms, equal in number to the number of screws fastening the disc clamp to the spindle motor hub. The radially extending arms are centered between adjacent screws, and have a width selected to divide the angular displacement between adjacent screws into thirds. The thickness of the shim is selected to evenly distribute the clamping force of the screws about the circumference of the disc clamp.

5 Claims, 5 Drawing Sheets

DISC CLAMP SHIM FOR A RIGID DISC DRIVE

BACKGROUND OF THE INVENTION

1. Field of the Invention

This invention relates generally to the field of rigid disc drive data storage devices, and more specifically, but not by way of limitation, to a mechanism which contributes to the even distribution of clamping force by the disc clamp used to mount the discs to the spindle motor in a rigid disc drive data storage device.

2. Brief Description of the Prior Art

Rigid disc drive data storage devices—or disc drives—of the type known as "Winchester" disc drives are well known in the industry. In such disc drives, one or more rigid discs, coated with a magnetizable medium, are mounted for rotation at a constant high speed on a spindle motor. An array of heads—typically one per disc surface—is mounted for controllable motion to an actuator which moves the heads across the surfaces of the discs to any desired one of a plurality of circular, concentric data tracks. These heads are used to record—or write—and retrieve—or read—data on the recording medium, and include a self-acting hydrodynamic air bearing surface which cooperates with a thin layer of air dragged along by the spinning discs to fly the heads slightly above the disc surfaces.

In early disc drives of this type manufactured in the 5¼ inch form factor, the data tracks on the disc surfaces were distributed on the disc surfaces at a radial track density of only 300–400 tracks per inch (tpi), and the heads were designed to fly approximately 12–14 inches above the disc surfaces. Market demands for smaller form factors and increased data capacity have lead to current disc drive products with track densities in the range of 1800–2600 tpi, and head flying heights of only 2.5–4.0 inches.

The technological advances which have lead to the current families of products in the 2½ inch and smaller form factors have included improved heads, media, actuators and systems for controlling the movement of the heads between tracks.

The need to provide the maximum amount of storage capacity—and thus the maximum number of discs—in these small form factors has lead to the use of aluminum discs which are only 0.025 inches thick, and the expected use of canasite discs only 0.015 inches thick. Furthermore, since these types of disc drives are intended for use in laptop and notebook types of computer systems, they are expected to withstand mechanical shocks in the range of 150–300 Gs. In order to meet such rigorous shock specifications, the clamping force used to secure the discs to the spindle motor must be on the order of 100–120 lb.

A typical type of disc clamp for securing the discs to a spindle motor is disclosed in co-pending U.S. patent application 07/893,490. In such a disc clamp, a contact area is circumferentially formed about the outer diameter of the disc clamp. This contact area is displaced out-of-plane from the remainder of the disc clamp in the direction intended to be toward the discs when the clamp is installed, and a plurality of screws, disposed radially inward from the contact area, attach the inner portion of the disc clamp to the spindle motor hub. In this manner, the juncture of the contact area and the unformed center of the disc clamp acts as a spring mechanism to clamp the inner diameter of the discs in place.

A problem arises with the use of this type of disc clamp, however, when the above noted disc thickness and clamping forces are considered. Since the disc clamp is secured with a plurality of screws circumferentially spaced about the periphery of the disc clamp, the majority of the clamping force is exerted at the location of the screws, with a substantially lesser force applied to the discs in those areas between the screws. This variation in clamping force can cause the discs themselves to be mechanically distorted in a manner sometimes referred to as "potato chipping", meaning that the areas of the discs adjacent the disc clamp screws are displaced further from the disc clamp than the areas of the discs between the screws.

Distortion of the discs from an ideal flat condition leads to undesirable modulation of the read/write signals detected and produced by the heads of the disc drive. That is, since the heads will fly at varying heights about the circumference of the disc when attempting to follow a distorted disc, the signals used to write and read data on the discs may be inadequate to ensure reliable data storage and recovery.

It would therefore be desirable to develop a mechanism which would aid in more evenly distributing the clamping force of the disc clamp about the inner diameter of the discs, thus reducing distortion of the discs and minimizing undesirable data signal modulation.

SUMMARY OF THE INVENTION

The present invention is a shim device intended for insertion between the uppermost disc in a disc stack and the disc clamp used to secure the discs to a spindle motor. The shim includes features for centering the shim relative to the discs and disc clamp and a plurality of radially extending arms each of which is disposed to lie between an adjacent pair of the screws used to secure the disc clamp to the hub of the spindle motor. The width of each of these radially extending arms is selected relative to the angular separation between adjacent screws to divide the angular separation into three equal segments, and the thickness of the shim is selected to evenly distribute the clamping force between the areas of the disc immediately adjacent the screws and adjacent the outer edges of the radially extending arms.

It is an object of the invention to provide a mechanism for evenly distributing the clamping force applied by a disc clamp to a disc mounted for rotation on the hub of a spindle motor in a disc drive data storage device.

It is another object of the invention to provide, by such evenly distributed clamping force, reduced mechanical distortion of the discs.

It is another object of the invention to provide reduced modulation of the data signals between the discs and associated read/write heads as a result of reduced mechanical distortion of the discs.

It is another object of the invention to provide a mechanism for the even distribution of clamping forces between a disc clamp and a stack of discs mounted on the hub of a spindle motor which is simple and inexpensive to implement.

The operation of the invention in achieving the above objects, as well as other features and benefits of the invention, can best be understood by reviewing the following detailed description of the invention in conjunction with the accompanying drawings.

DETAILED DESCRIPTION OF THE INVENTION

Figure 1:
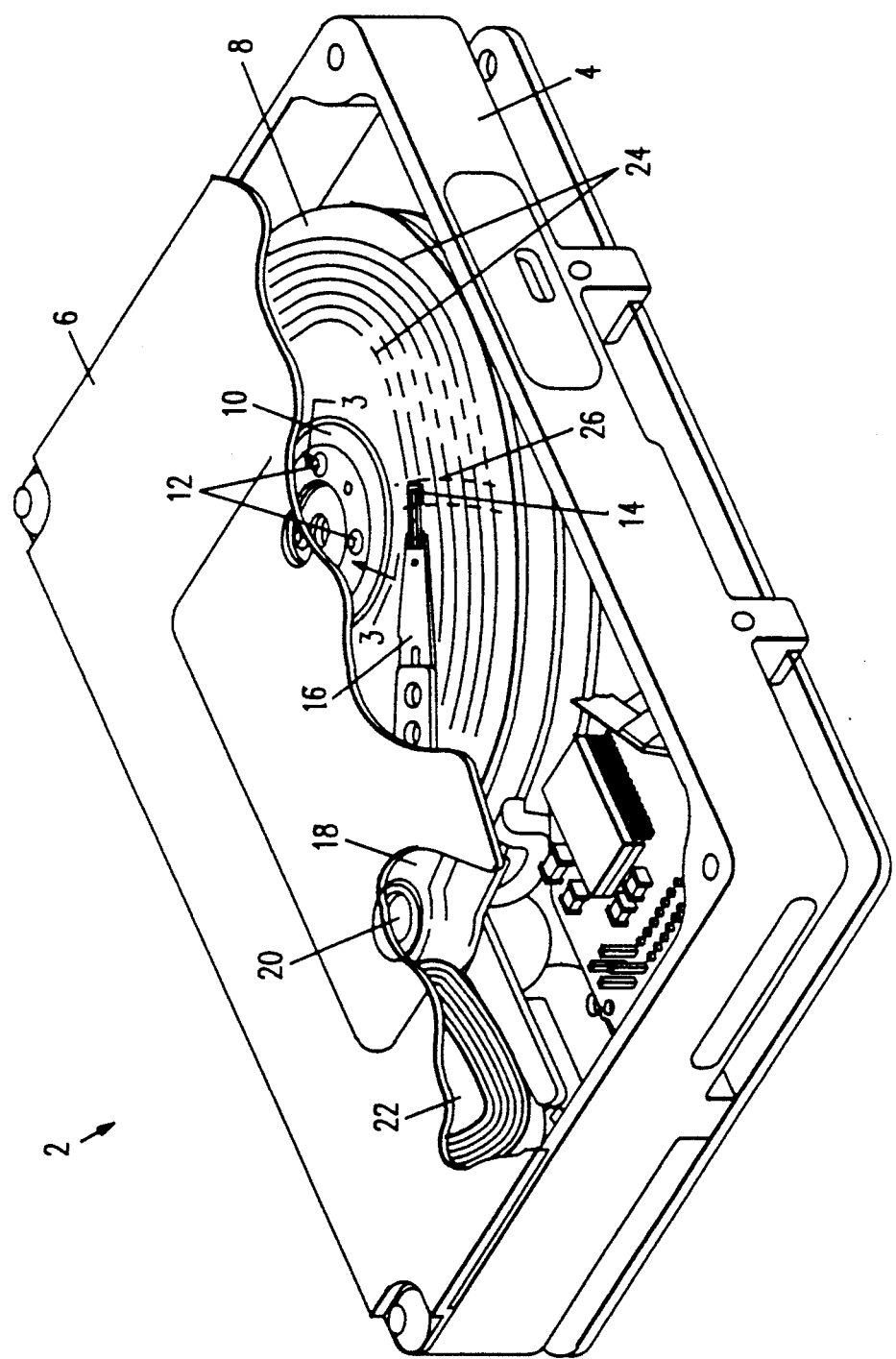
FIG. 1 is an isometric view, in partial cutaway, of a disc drive data storage device in which the present invention is particularly useful.

Turning now to the drawings and more particularly to FIG. 1, shown is an isometric view of a disc drive 2 of the type in which the present invention is particularly useful. The disc drive 2 includes a housing base 4 and a top cover 6 which cooperatively engage to form a sealed housing which serves to protect delicate internal components from external contaminants.

At least one disc 8 is mounted for rotation on a spindle motor hub (not shown) using a disc clamp 10. In this example, the disc clamp 10 is secured using screws 12 equally spaced about the perimeter of the disc clamp 10. An array of heads (one shown at 14) is mounted via flexure assemblies 16 to an actuator body 18 which is adapted for pivotal motion about a pivot shaft 20 under control of an actuator motor, shown generally at 22. The actuator motor 22 is driven by electronic circuitry (not shown) to controllably move the heads 14 to any desired one of a plurality of concentric circular tracks 24 on the discs 8 along arcuate path 26.

The disc drive 2 is an example of the 2.5 inch form factor, wherein the discs 8 have an outer diameter of 65 mm, an inner diameter of 12 mm and a thickness of 0.015–0.025 inches. Such a disc drive unit is typically specified to withstand 150 Gs of mechanical shock and, in order to meet this specification—with, for example, three discs—would require that the discs be clamped with a force of approximately 100–120 lb.

Figure 2:
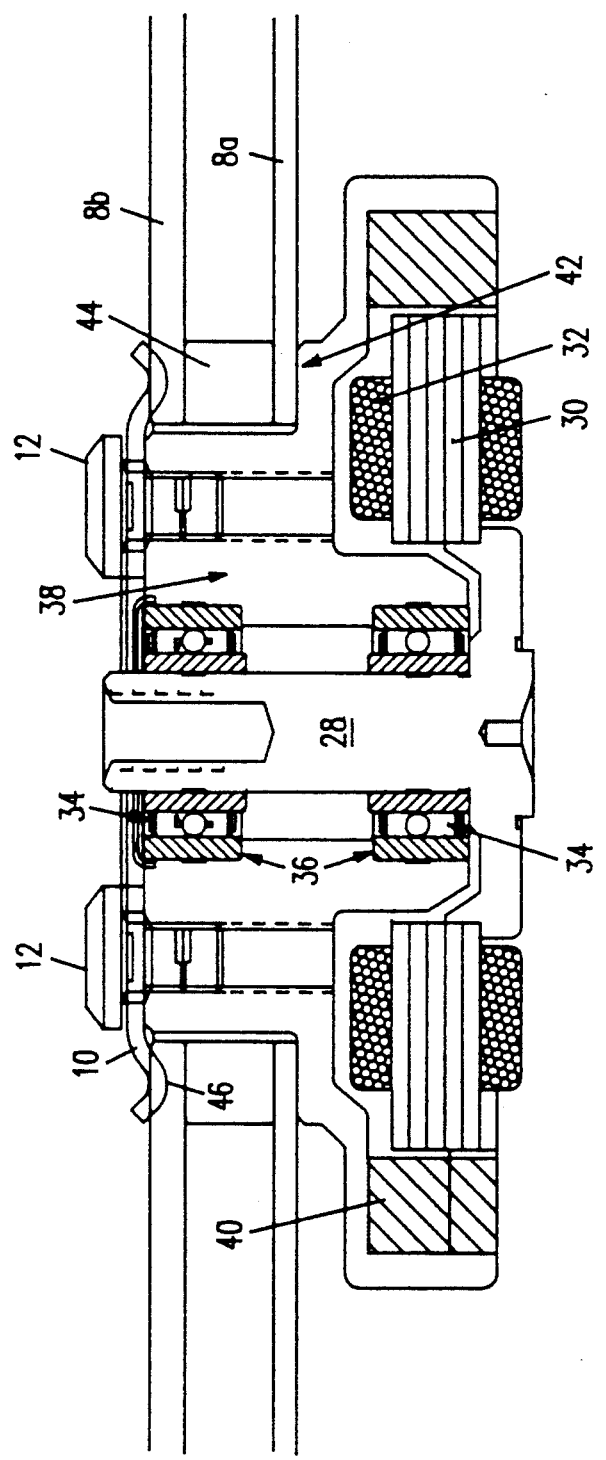
FIG. 2 is a sectional view illustrating a prior art approach to disc clamping.

FIG. 2 is a sectional view of the spindle motor/disc stack area of the disc drive 2 of FIG. 1, and shows a prior art approach to disc clamping. The spindle motor (not separately designated) includes a stationary shaft 28 fixedly attached to the housing base and top cover (both not shown). Fixedly mounted to a specially adapted feature of this shaft 28 are a stack of stator laminations 30 and associated stator windings 32. A pair of ball bearing assemblies 34 have their inner races fixed on the shaft 28 and their outer races 36 fixed to a hub 38, which in turn mounts a permanent magnet 40 which forms the rotor of the spindle motor. The hub 38 includes a disc flange 42 on which rests a lower disc 8a. A disc spacer 44 sits atop the inner diameter of the lower disc 8a and separates the lower disc 8a from an upper disc 8b. The disc clamp 10 is shown in its "as-formed" condition. As shown in the figure, the contact surface 46 of the disc clamp 10 lies within the space occupied by the upper disc 8b. In actuality, tightening the screws 12 which attach the disc clamp 10 to the hub 38 would cause the outer portion of the disc clamp 10 to be displaced upward relative to the remainder of the disc clamp 10, causing a spring action which retains the discs 8a, 8b and disc spacer 44 relative to the hub 38.

Figure 3:
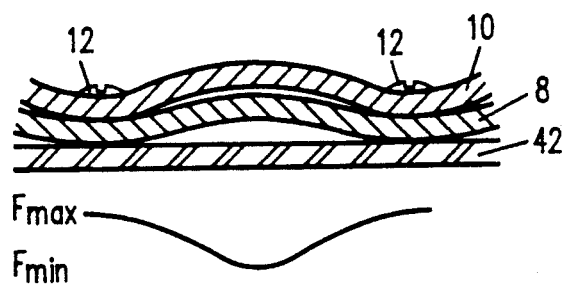
FIG. 3 is a diagrammatic sectional view of the prior art disc clamping approach of FIG. 2 with an accompanying graph of the distribution of clamping forces exerted.

FIG. 3 is a diagrammatic partial radial sectional view taken along line 3—3 of FIG. 1, showing the same prior art approach to disc clamping as was described above in regard to FIG. 2. For purposes of this discussion, it is assumed that a single disc 8 is to be captured between the disc clamp 10 and the disc flange 42 which is a part of the spindle motor hub. The graph at the bottom of the figure shows the clamping force exerted between the disc clamp 10 and the disc flange 42 as a function of circumferential location. In the figure, the screws 12 holding the disc clamp 10 to the hub of the spindle motor, of which the disc flange 42 is a part, can be seen to apply maximum clamping force, $F_{max}$, in the areas local to the screws 12, while the areas of the disc clamp 10 between the screws 12 receive a much lesser amount of clamping force, $F_{min}$. Because of this variation in clamping force, the disc clamp 10 and—more importantly—the disc 8 are shown to be mechanically distorted from an ideal flat condition. While the amount of distortion is greatly exaggerated in the figure, it should be recalled that the heads (not shown) in such a disc drive typically fly at a height of 4.0 μinches or less above the disc surface, and, as such, distortion of the disc 8 in amounts as small as 200 μinches would be expected to result in unacceptable modulation of the data signals between the head and disc.

Figure 4:
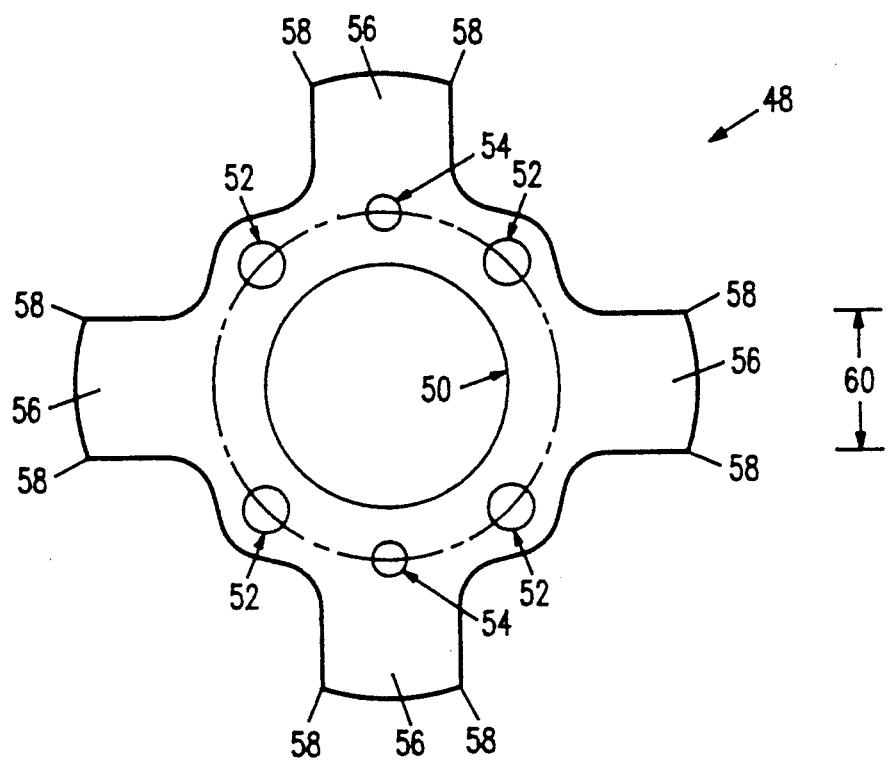
FIG. 4 is a plan view of the shim of the present invention.

Turning now to FIG. 4, shown is a plan view of a shim 48 made in accordance with the present invention. The shim 48 has a central portion which includes a central opening 50 in this embodiment to accommodate the stationary shaft (28 in FIG. 2) of the motor discussed above. If the motor included a shaft which rotated with the hub, such an opening would not be necessary. Arranged equidistantly about the central opening 50 is a plurality of alignment holes 52. These holes are of the same number and in the same relative position as the screws (12 in FIG. 1) used to secure the disc clamp to the hub of the spindle motor. Thus, when the shim 48 is inserted between the disc clamp and the hub, and the screws 12 are utilized to secure the disc clamp 10, the shim 48 is fixed in position radially and circumferentially relative to the disc clamp. An additional pair of tooling holes 54 would be aligned with a similar pair of holes in the disc clamp and hub to allow the use of a spanner tool to secure the spindle motor during the tightening of the screws.

Alternative apparatus for the radial and circumferential alignment of the shim with the clamp and hub can be envisioned. For instance, the shim can be made with a plurality of tabs bent downward to engage machined holes in the hub of the spindle motor, or a plurality of upwardly extending buttons can be cast in the top surface of the spindle motor hub which would engage holes formed in the shim material.

The shim 48 is also comprised of a plurality of radially extending arms 56 which are each centered between adjacent alignment holes 52. The extreme outer extent of these arms 56 lies on a radius slightly larger than the radius of the contact surface (46 in FIG. 2), and forms a pair of contact points 58 on each arm 56 where the radius of the contact surface (46 in FIG. 2) meets the sides of the arm. The width 60 of these arms 56 is selected such that the contact points 58 divide the angular displacement between adjacent screws into thirds. In the example shown, with four screws spaced 90° apart, the contact points 58 would lie at 30° intervals between the alignment holes 52.

The shim of the present invention would be equally effective for use with disc clamps having a different number of screws. For instance, if the disc clamp were fastened with five screws spaced 72° apart, the shim would include five arms and the width of the arms would be selected to place the contact points and alignment holes 24° apart. Similarly, with a six-screw disc clamp, the 60° radial displacement between adjacent screws would be divided into three 20° intervals.

Figure 5:
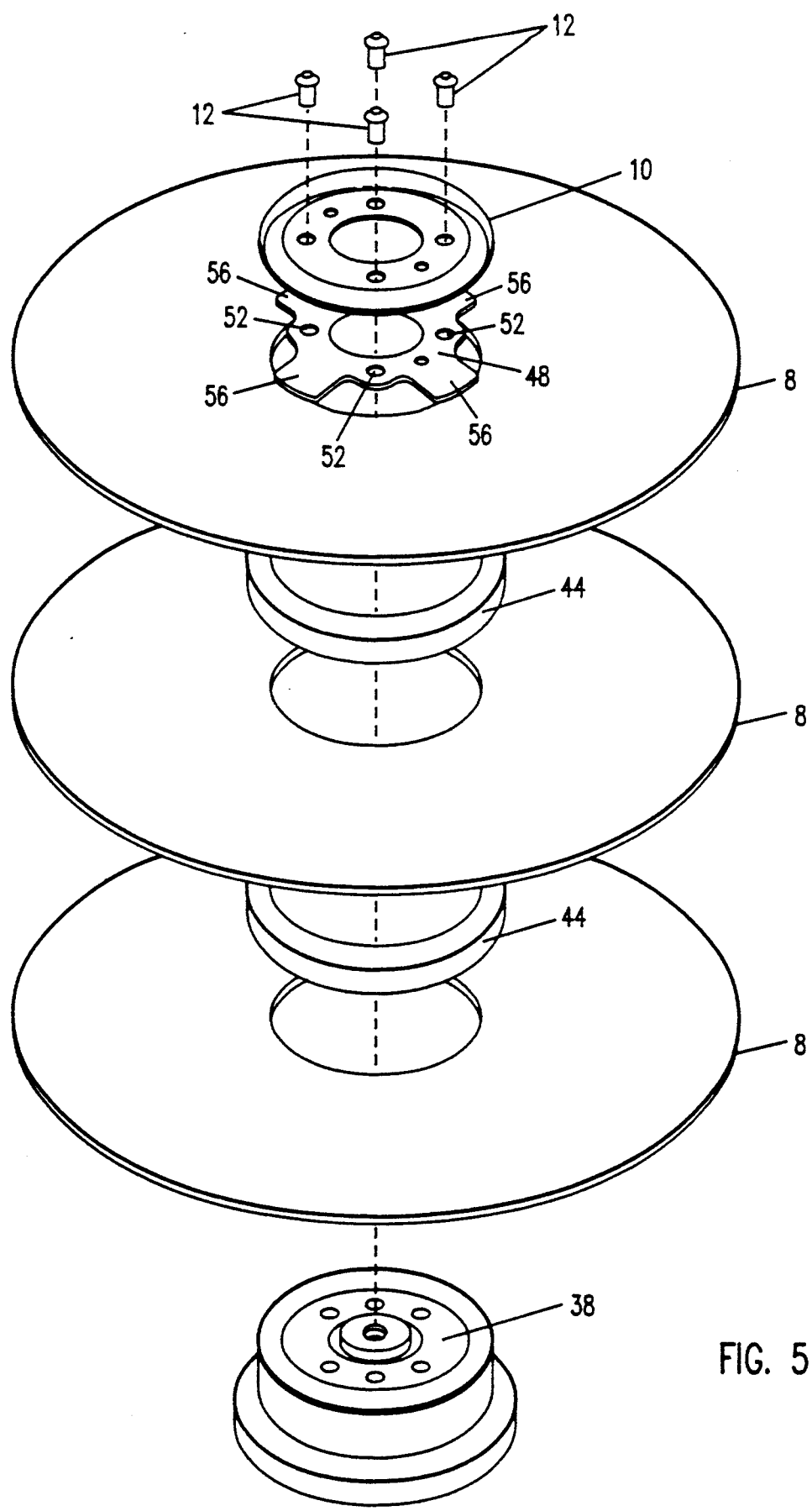
FIG. 5 is an exploded view of a disc clamping system made in accordance with the present invention.

FIG. 5 is an exploded view of a disc clamping scheme using the present invention. The shim 48 can be seen to be interposed between the disc clamp 10 and the hub 38 of the spindle motor, and the screws 12 used to fasten the disc clamp 10 to the hub 38 pass through the alignment holes 52 in the shim 48. The example shown includes three discs 8 separated by disc spacers 44. Examination of the figure further shows that the arms 56 of the shim 48 are centered between the screws 12.

Figure 6:
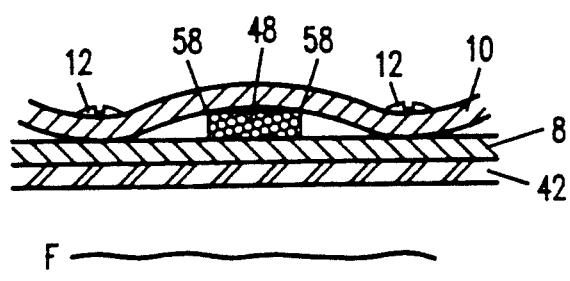
FIG. 6 is a diagrammatic sectional view of a disc clamping system made in accordance with the present invention with an accompanying graph of the distribution of clamping forces exerted.

The effect of the shim of the present invention can best be seen by an examination of FIG. 6. FIG. 6 is a diagrammatic radial sectional view, similar to that of FIG. 3, of a disc clamping scheme incorporating the present invention. A graph at the bottom of the figure shows the distribution of the clamping force, F, between adjacent screws 12. As can be seen in the figure, even though the disc clamp 10 is still warped by application of the clamping force at the screws 12, the area of weakened clamping force between the screws 12 is now occupied by the shim 48. This causes contact between the shim 48 at the contact points 58 and the disc clamp 10 and disc 8, resulting in the more evenly distributed clamping force seen in the graph, and further resulting in the disc 8 lying flat against the disc flange 42. Proper selection of the thickness of the shim material can allow matching with a known disc clamp and clamping force to minimize, or eliminate, distortion of the disc 8 brought about by uneven force application.

Figure 7A:
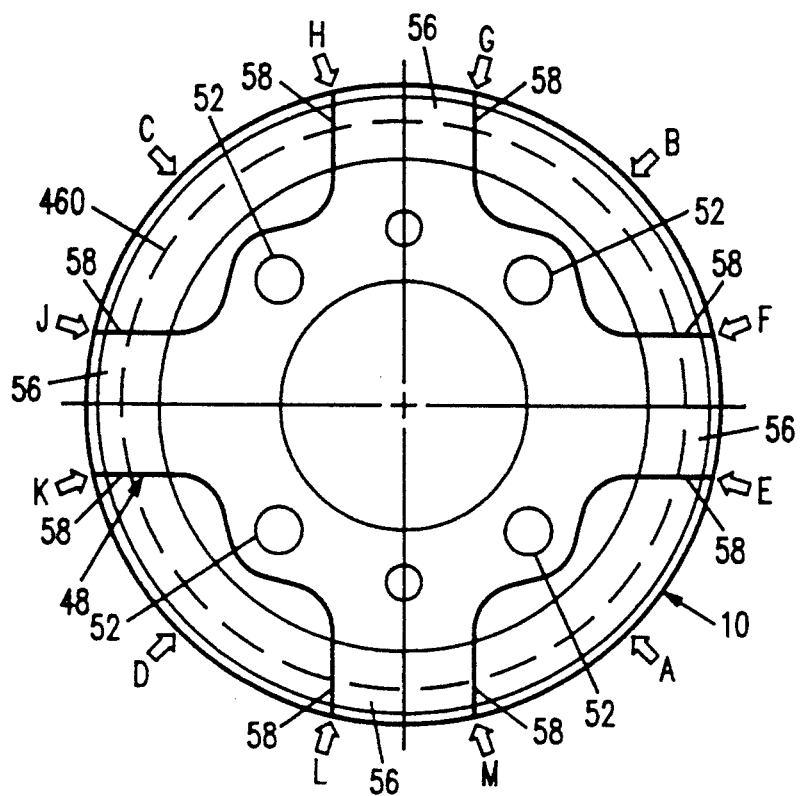
FIGS. 7a and 7b are plan and sectional elevation views, respectively, showing the shim of the present invention and a disc clamp.
Figure 7B:
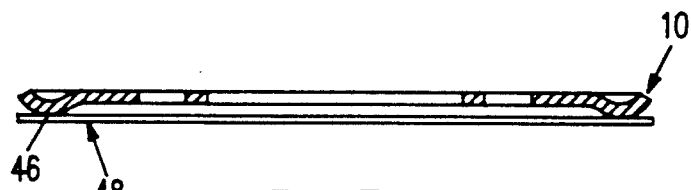

FIGS. 7a and 7b are plan and sectional elevation views, respectively, of the shim 48 of the present invention and an associated disc clamp 10 which are both intended to be fastened to the hub of a spindle motor with four screws (not shown) spaced 90° apart. In FIG. 7b, it can be seen that the disc clamp 10 is shown in its "as formed" condition, i.e., before the clamping force is applied to the disc clamp 10 by the screws. This figure most clearly shows that the radius, designated by dotted line 46a, of the contact surface 46 intersects the outer edges of the radially extending arms 56 to form the contact points 58. If the shim 48 were not interposed between the disc clamp 10 and the spindle motor hub, the maximum clamping force would be exerted at the points designated A, B, C and D opposite the screw holes/shim alignment holes 52, as was described above in the discussion of FIG. 3. If, however, the shim 48 is in place between the disc clamp 10 and the spindle motor hub, then the clamping force would be distributed at points A-M, i.e., at the points opposite the screws (A, B, C and D), as well as the areas adjacent the contact points 58 of the shim 48 (E-M), as was explained above in relationship to FIG. 6.

In laboratory experiments carried out using a shim thickness of 0.0005 inches with an existing disc clamp, modulation of the data signals to and from the disc have been reduced on the order of 40%.

The shim of the present invention is simple and inexpensive to fabricate and adds minimal additional assembly effort.

It is evident that the present invention is well adapted to meet the objects and achieve the ends stated as well as those inherent therein. While a presently preferred embodiment of the invention has been disclosed, modifications that lie within the scope and spirit of the invention may become evident to one skilled in the art after reviewing this disclosure. The scope of the invention is therefore to be limited only by the appended claims.

What is claimed is:

1. In a disc drive data storage device comprising at least one disc mounted for rotation on a hub of a spindle motor and a disc clamp for securing the disc to the hub, the disc clamp comprising a contact surface near its outer extreme for engaging the inner portion of the disc, the disc clamp being fastened to the hub by a plurality of screws equidistantly spaced circumferentially about the disc clamp:

a plurality of shim members interposed between the contact surface of the disc clamp and the disc, the shim members being equal in number to the number of screws and each shim members centered circumferentially between adjacent screws.

2. A plurality of shim members as claimed in claim 1 wherein the shim members are integral to a central portion lying between the disc clamp and the hub, the central portion including alignment means for aligning the shim members radially and circumferentially with the disc clamp and hub.

3. A plurality of shim members as claimed in claim 1 wherein each shim member has a circumferential extent, at the radius of the contact surface, which is one third of the angular displacement between adjacent screws.

4. In a disc drive data storage device including at least one disc secured to a hub of a spindle motor using a disc clamp, the disc clamp including a circumferential contact surface near its outer periphery, the contact surface engaging the disc near its inner diameter, the disc clamp fastened to the hub by a plurality of screws equally spaced about a circle spaced radially inward from the contact surface of the disc clamp, a shim, interposed between the disc clamp and the hub, comprising
      a plurality of radially extending arms equal in number to the number of screws, the radial extent of the arms being slightly larger than the radius of the contact surface,
      the arms thus forming contact points where the radius of the contact surface meets the sides of the arms, and
      alignment means for positioning the radially extending arms equidistantly between adjacent screws,
   the width of the arms selected such that the contact points divide the angular displacement between adjacent pairs of screws into thirds, with contact between the contact surface, contact points and disc serving to evenly distribute a clamping force from the screws through the disc clamp and shim to the disc.

5. A shim as claimed in claim 4, wherein the alignment means comprises a plurality of alignment holes equal in number and arranged to align with the screws, whereby insertion of the screws through the disc clamp and alignment holes and into the hub fixes the shim in place relative to the disc clamp, hub and disc.

* * * * *